United States Patent [19]

Cornillault

[11] Patent Number: 4,479,717
[45] Date of Patent: Oct. 30, 1984

[54] APPARATUS FOR MEASURING THE POSITION OF AN OBJECT

[75] Inventor: Jean Cornillault, Nozay, France

[73] Assignee: Compagnie Industrielle des Lasers Cilas Alcatel, Marcoussis, France

[21] Appl. No.: 390,734

[22] Filed: Jun. 21, 1982

[30] Foreign Application Priority Data

Jun. 23, 1981 [FR] France .................. 81 12279

[51] Int. Cl.³ ............................................. G01B 11/00
[52] U.S. Cl. .................................. 356/375; 250/227
[58] Field of Search ................. 356/1, 4, 375, 376; 250/227

[56] References Cited

U.S. PATENT DOCUMENTS

| | | | |
|---|---|---|---|
| 3,327,584 | 6/1967 | Kissinger | 250/227 |
| 3,771,873 | 11/1973 | Tourret | 250/227 |
| 3,778,157 | 12/1973 | Brelot et al. | 250/227 |
| 3,792,928 | 2/1974 | Poilleux | 250/227 |
| 4,247,764 | 1/1981 | Kissinger | 250/227 |
| 4,373,805 | 2/1983 | Mallison | 356/4 |

FOREIGN PATENT DOCUMENTS

2399000 2/1979 France .

OTHER PUBLICATIONS

Advances in Test Measurement, vol. 5, Proceedings of the 5th Annual ISA Test Measurement Symposium, N.Y., Oct. 28-31, 1968, Instr. Soc. of Am. Pittsburgh (US) R. B. Zipin: "Non-Contact Optical Fiducial" pp. 68-547; 1-5, FIGS. 1, 2, 3.

Primary Examiner—R. A. Rosenberger
Attorney, Agent, or Firm—Sughrue, Mion, Zinn, Macpeak and Seas

[57] ABSTRACT

A source of light (F1, 34) directs a light beam (35) towards an object. A photoelectrical measuring system (39) includes three measurement detectors (40, 41, 42) having respective reception fields (44, 45, 46). These fields overlap partially, and all of them share a volume of space in common with the beam (35). A reference photoelectrical system (F2, 36) detects light diffused by an object anywhere in said common volume. A processing system determines the distance of the object in said common field as a function both of which of the measurement detectors is detecting light diffused by the object and of the ratio between the measurement signal detected thereby and the reference signal from the reference system. The apparatus may be used to equip the pincers of an industrial robot.

5 Claims, 4 Drawing Figures

APPARATUS FOR MEASURING THE POSITION OF AN OBJECT

The present invention relates to apparatus for measuring the position of an object, and more particularly to apparatus for measuring the position of an object which is at a relatively short distance form the apparatus.

BACKGROUND OF THE INVENTION

One known apparatus for measuring the position of an object comprises a light beam generator for sending a beam of light along an emission axis, and a photoelectric receiver provided with an optical reception system providing a reception field which surrounds a reception axis. The emission axis intersects the reception axis at a fairly short distance from the apparatus to define a volume of space common to both the light beam and the reception field.

When an object moves away from the apparatus in such a manner that it passes through the common volume, the receiver delivers an electrical signal that begins by rising, that passes through a peak as the object passes through the point of intersection of both axes, and that then falls off. The point of intersection is at a defined distance from the apparatus. When the electrical signal passes through its maximum, the object is thus located as being at said point of intersection.

The above apparatus has its drawbacks. It cannot give an immediate reading of the distance to the object. To measure the distance it must proceed with optical scanning of the likely volume (eg. by moving the apparatus itself), until the desired maximum is obtained. This causes the apparatus to be fairly complicated.

Preferred embodiments of the present invention mitigate this drawback.

SUMMARY OF THE INVENTION

The present invention provides measuring apparatus for measuring the position of an object, the apparatus comprising:

a light generator capable of emitting a beam of light along an emission axis to illuminate the surface of said object;

a photoelectric receiver;

a converging optical measurement system having a reception field that shares a volume of space in common with said emission beam, the optical system being suitable for forming an image of at least a portion of said illuminated surface when the object passes through said common volume, whereby at least some of the light from the emission beam is diffused from the object to said receiver; and means for processing the electrical signal delivered by said receiver in response to illumination by said diffused light;

wherein said receiver comprises at least two photoelectric measurement detectors having reception surfaces disposed next to one another along a straight line that intersects said emission axis, said measurement detectors receiving light diffused in respective different reception fields in said common volume, said reception fields overlapping partially in such a manner that as the object moves from a minimum distance from the measuring apparatus to a maximum distance therefrom through said common volume, the response of each detector is to give an electrical signal that rises from a minimum value to a peak value and then falls back to the minimum, with the detectors being activated successively and with the peak response of each detector co-inciding substantially with the beginning of the rise in the response of the next successive detector, whereby the object moving in said manner initially occupies a first zone in which it activates a first detector on its own, then a second zone in which it activates both the first detector and and a second detector, and so on until it arrives in a last zone in which activates a last detector on its own, with measurement being performed on the basis of the signal from the detector having a rising slope of response with increasing object distance for the zone in which the object is located, and with no measurement being performed when the object is in the last zone and activates the last detector on its own;

wherein the apparatus further includes a reference photoelectric detector having a reception surface placed close to that of said photoelectric receiver, and a reference optical system for forming an image of the illuminated surface of the object on the reference detector, with the reference detector having a reception field that includes the entire illuminated surface of the object regardless of its position in the common volume, whereby the reference detector delivers an electrical signal proportional to the total light power diffused by the object;

and wherein said electrical signal processing means comprise:

a logic circuit connected to receive the electrical output signals from the measurement detectors to determine from said output signals the zone in which the object is located, and to select the corresponding detector having a rising response with increasing object distance in said detected zone;

a divider circuit connected to receive the output signal from the selected detector and to receive the output signal from the reference detector, and to deliver an output ratio signal proportional to the ratio between the amplitudes of said signals received thereby; and a processor circuit capable of determining the distance of the object on the basis of its zone and said ratio signal.

BRIEF DESCRIPTION OF THE DRAWINGS

Two embodiments of the invention are described by way of example with reference to the accompanying drawings, in which.

MORE DETAILED DESCRIPTION

Figure 1:
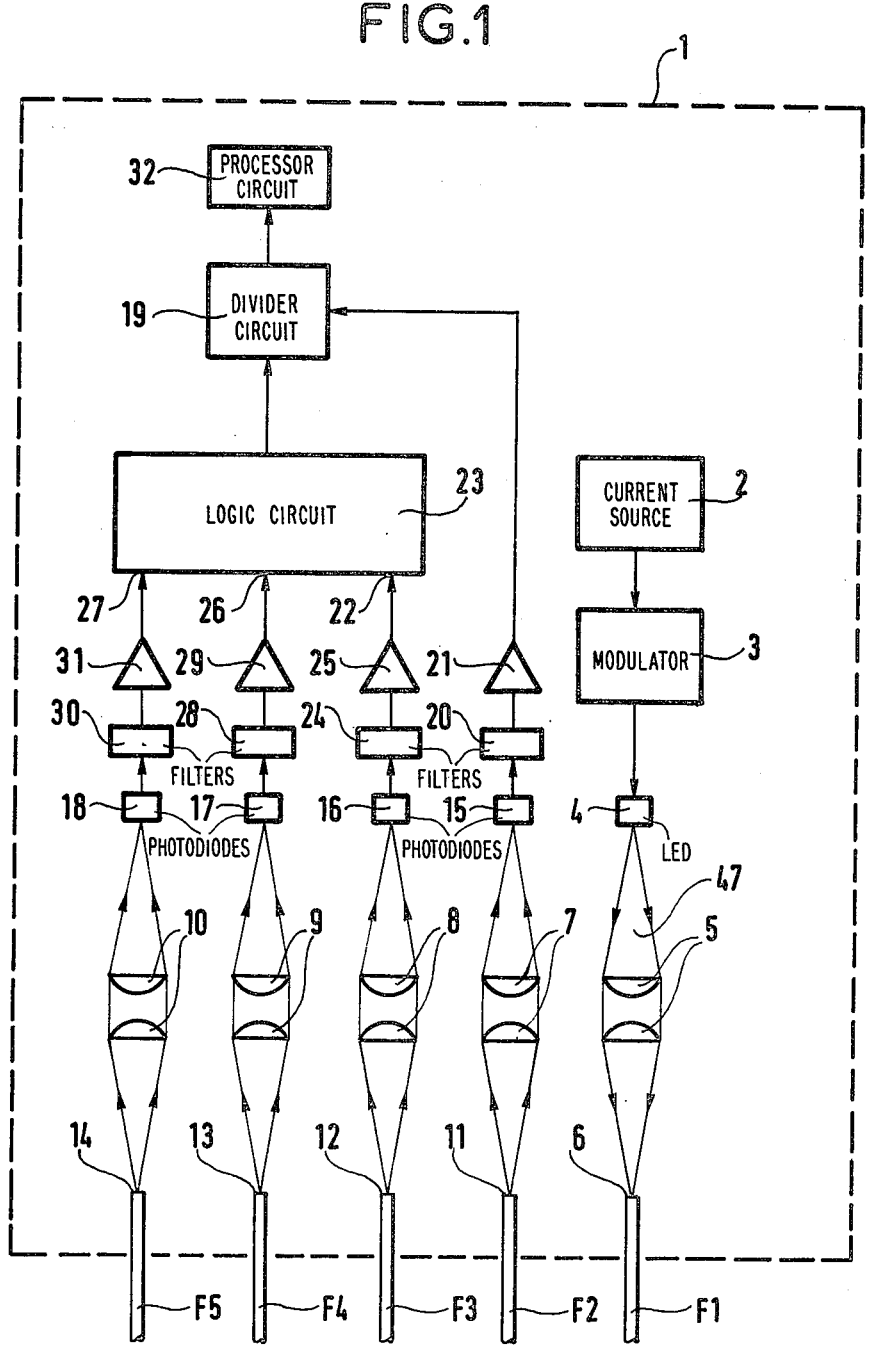
FIG. 1 is a block diagram of a portion of a first embodiment of the invention.

FIG. 1 shows a first housing 1, having a source of electric current 2 whose output is fed via a modulator 3 to a light source 4, eg. a light emitting diode (LED). An optical coupling system 5 comprising two convex lenses is disposed to form an image of the diode emission surface on one end 6 of an optical fiber F1 which leads out from the housing 1. Four other optical fibers F2 to F5 lead into the housing 1. They look into respective optical coupling systems 7 to 10 which form respective images of the ends 11 to 14 of the fibers on respective photosensitive surfaces of photoelectric detectors constituted by photodiodes 15 to 18. The electrical output of the photodiode 15 is connected via an electrical filter 20 and an amplifier 21 to an input to a divider circuit 19. The electrical output of the photodiode 16 is connected via an electrical filter 24 and an amplifier 25 to a first input 22 of a logic circuit 23. Likewise the electrical outputs of the photodiodes 17 and 18 are connected via respective electrical filters 28 and 30 and amplifiers 29 and 31 to second and third inputs 26 and 27 of the logic circuit 23. The logic circuit 23 has an output connected to a second input to the divider circuit 19, and the divider circuit 19 has an output connected to a processor circuit 32.

Figure 2:
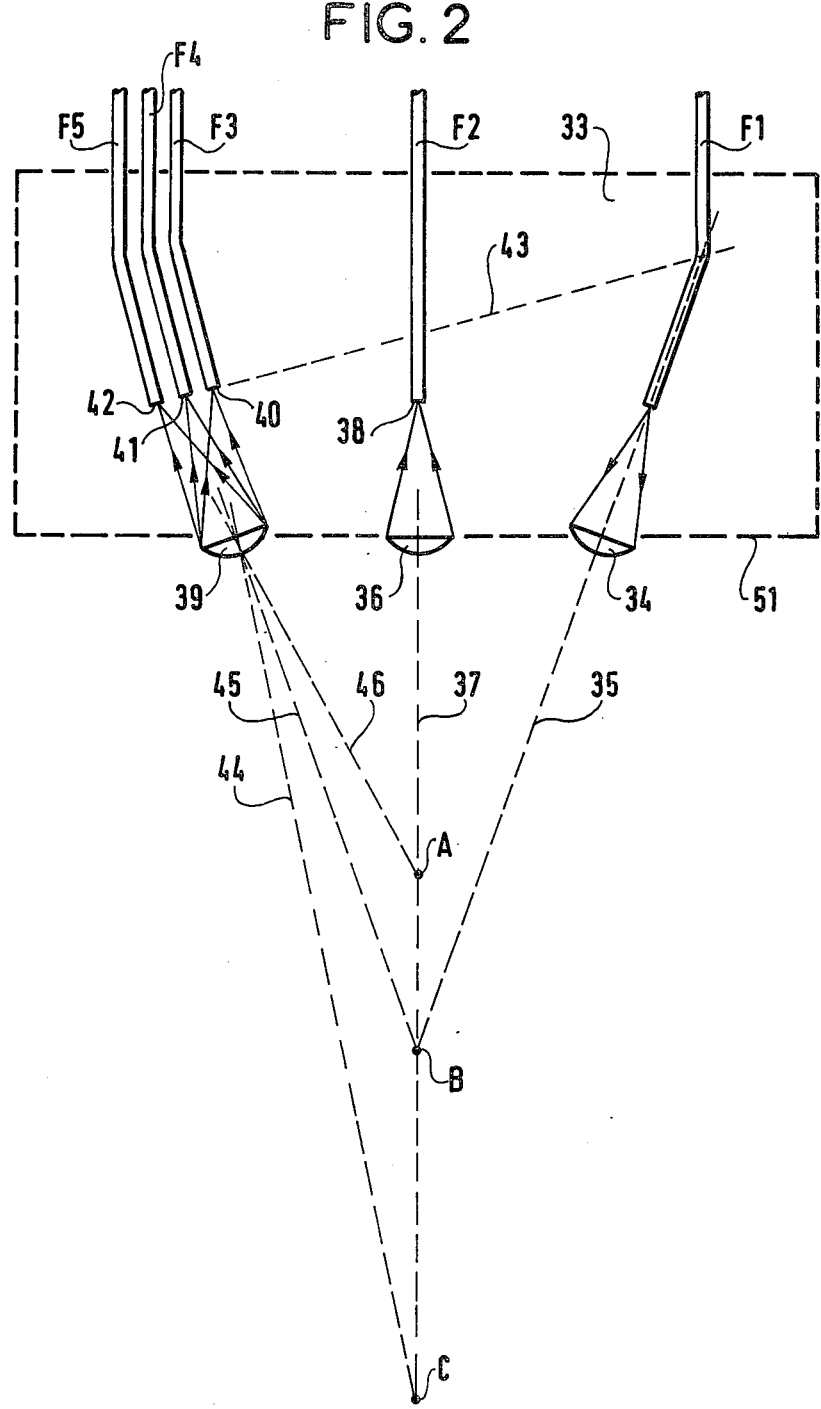
FIG. 2 is a diagram of another portion of the FIG. 1 embodiment.

The other ends of the optical fibers F1 to F5 are disposed in a second housing 33, shown in FIG. 2. The second housing 3 contains an emission optical system comprising a converging lens 34 disposed in front of the distant end of the optical fiber F1 and on an emission axis 35. A reference optical system comprises a lens 36 centered on an axis 37 and disposed in front of the inlet face 38 of the optical fiber F2. An optical measuring system comprises a lens 39 disposed in front of the inlet faces 40, 41, and 42 of the three fibers F3, F4, and F5. The inlet faces 40, 41 and 42 are disposed side by side along a straight line 43 intersecting the emission axis 35. Together with the three inlet faces 40, 41, and 42 the optical system 39 defines three reception axes 44, 45, and 46.

The inlet face 38 of the fiber F2 is disposed close the inlet faces 40, 41, and 42 of the three fibers F3, F4, and F5. The axes 35, 37, 44, 45 and 46 are preferably situated in the same plane. As shown in FIG. 2 the axis 37 passes through the point of intersection between the emission axis 35 and the average reception or measurement axis, as substantially represented by the middle axis 45. The axis 37 extends perpendicularly from the far side 51 of the second housing 33 inside an acute angle formed by the emission axis 35 and the reception axis 45.

The apparatus shown in FIGS. 1 and 2 operates as follows:

The LED 4 emits a light beam 47 whose intensity is modulated by a squarewave signal applied to the modulator 33 at a frequency f. The optical system 5 concentrates this beam on the inlet face 6 of the optical fiber F1. The light energy is conveyed thereby to the outlet face of the optical fiber F1 situated inside the second housing 33. The lens 34 collects this light energy and emits a beam (not shown) centered on the axis 35. The beam is of small and substantially constant diameter.

Together with the inlets to the fibers F3, F4, and F5, the lens 39 defines three optical reception fields centered on the axes 44, 45 and 46 respectively. Each of these fields includes a volume that is in common with the emission beam from the lens 34. When an object is situated in the common volume of the emission beam an one of the reception fields, the object is illuminated by the emission beam, and the fiber F3, F4 or F5 corresponding to the reception field in question receives a light signal derived from diffuse reflection of a portion of the emission beam by the illuminated object. Light signals received by the fibers F3, F4, and F5 are transmitted by the fibers to the respective optical systems 8, 9, and 10, and thus onto the photosensitive surfaces of the photodiodes 16, 17 and 18.

The lens 36 and the inlet 38 to the optical fiber F2 defines a reception field contred on the axis 37. This reception field is large enough to include the entire illuminated surface of the object, regardless of the position of the object in the common emission-reception volume. The inlet face 38 of the fiber F2 thus receives a signal whose amplitute is representative of the total emission power, once account has been taken of the object's aldebo. This light signal is transmitted by the fiber F2 to the photosensitive surface of the reference photodiode 15.

The inlet faces 40, 41, and 42 of the optical fibers F3, F4 and F5 are disposed next to one another along a straight line 43 in such a manner that the three reception axes 44, 45, and 46 overlap partially in the common emission reception volume.

Figure 3:
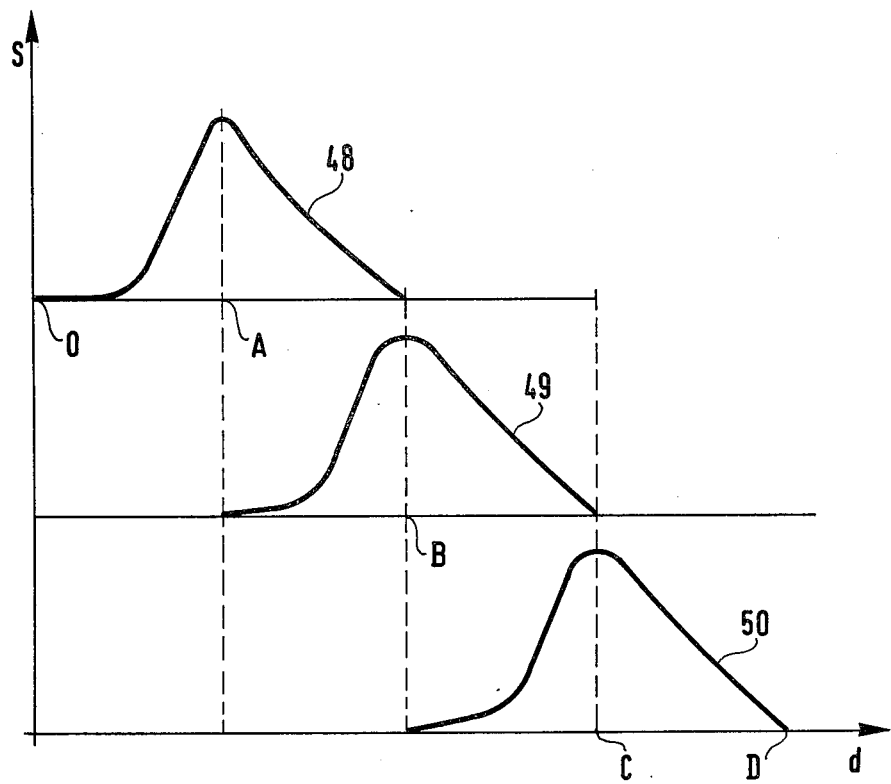
FIG. 3 is a response curve diagram showing the operation of the embodiment of FIGS. 1 and 2.

This overlap is shown in FIG. 3 which is a diagram in which three response curves are superposed to show the amplitude variation of of the electrical signals successively delivered by the photodiodes 18, 17, and 16 as an object moves away from the second housing 33 along the axis 37 passing successively through a point A where the axis 37 intersects the axis 46, a point B where the axis 37 intersects the axis 45 and a point C where the axis 37 intersects the axis 44. The X-axis of FIG. 3 shows distance d along the axis 37, while the Y-axis shows the amplitude S of the electrical signals from the photodiodes 18, 17, and 16.

Thus, before arriving at the point A, the object passes through a first zone OA in which the photodiode 18 delivers a rising signal as indicated by a curve 48. The signal rises to a peak when the object reaches the point A.

As the object then moves through the zone AB which corresponds to the overlap between the optical reception fields of the fibers F5 and F4, the photodiode 18 delivers a signal which falls from its peak to zero, while the photodiode 17 delivers a signal shown by a curve 49 which rises from zero to a peak.

The object the moves through a third zone BC which corresponds to the overlap between the optical reception fields of the fibers F4 and F3. In this zone, the photo diode 17 delivers a signal which falls from the peak at B to zero at C, while the photodiode 16 delivers a signal shown by a curve 50 which rises from zero to a peak at C.

Finally the object moves through a fourth zone CD in which the photodiode 16 delivers a signal which falls from its peak value at C to zero at D.

The distance of the object is determined by analog measurement of the electrical signals delivered by the photodiodes 16, 17, and 18.

To determine the distance of the object it is necessary to decide which of the three signals to use for the measurement. The diode 18 is used to measure the distance of an object in the zone OA, the diode 17 is used for an object in the zone AB, the diode 16 is used for an object in the zone BC, and measurements are not made to objects in the zone CD. This arrangement makes use of the rising edges of the response curves of the photodiodes, thereby eliminating ambiguity and improving accuracy in that the rising portion of the curves is steeper than the falling portion.

The logic circuit 23 receives the signals from the three measurement photodiodes after filtering and amplification, and serves to detect which zone the object is in. If there is just one signal on input 27, the object is in the zone OA, if there are two input signals, one on input 27 and te other on input 26, the object is in the zone AB, two signals on inputs 26 and 22 indicate that the object is in the zone BC, and a single input signal on the input 22 indicates that the object is in the zone CD.

The filters 20, 24, 28, and 30 are bandpass filters centered on the frequency f applied by the modulator 3 to the emission light signal. These filters serve to eliminate optical noise which may come from the surroundings of the measurement system.

The electrical signal delivered by the reference photodiode 15 is proportional to the total light power diffused by the object. It is used to correct for the actual power of light emission and the aldebo of the particular object.

The divider circuit 19 determines the ratio between the amplitude of the signal delivered by the measurement photodiode designated by the logic circuit 23, and the amplitude of the signal delivered by the reference photodiode 15.

The value of this ratio is equal to the ratio of the area of the object which is common to the light beam and the reception field of the designated measurement photodiode, and the total illuminated area of the object. This ratio is thus representative of the position of the object in the designated zone. To a first approximation, the length of the designated zone OA, AB or BC simply needs to be weighted by the ratio obtained from the circuit 19. A more accurate measurement can be obtained by prior calibration of the apparatus. The processor circuit 32 serves to perform the necessary calculations to provide an output signal representative of the distance of the object along the measurement axis 37.

The apparatus in accordance with the invention is particularly intended for use in robotics, for measuring the distance between a moving pincer and an object it is to grasp. The apparatus is used to signal when the object is at a predetermined distance from the pincer so that the pincer's grasping action can be initiated. In such a case the second housing 33 can be made very light and compact and can be mounted on the pincer itself, while the first housing 1 remains on a fixed part of the apparatus connected to the second housing 33 by the flexible optical fibers F1 to F5.

Naturally the entire apparatus could be mounted in a single housing, in which case the optical fibers and their optical coupling systems could be eliminated, whith the LED being located directly in front of the emission optical system and the photodiodes being located directly behind the reception and the reference optical systems.

By way of example, apparatus of the type shown in FIGS. 1 to 3 can be made to measure distances lying in a range of 0 to about 10 cm from the apparatus, with an accuracy of about 0.1 mm.

Further, the number of detectors need not be limited to three: there must be at least two of them, but there could be more.

Figure 4:
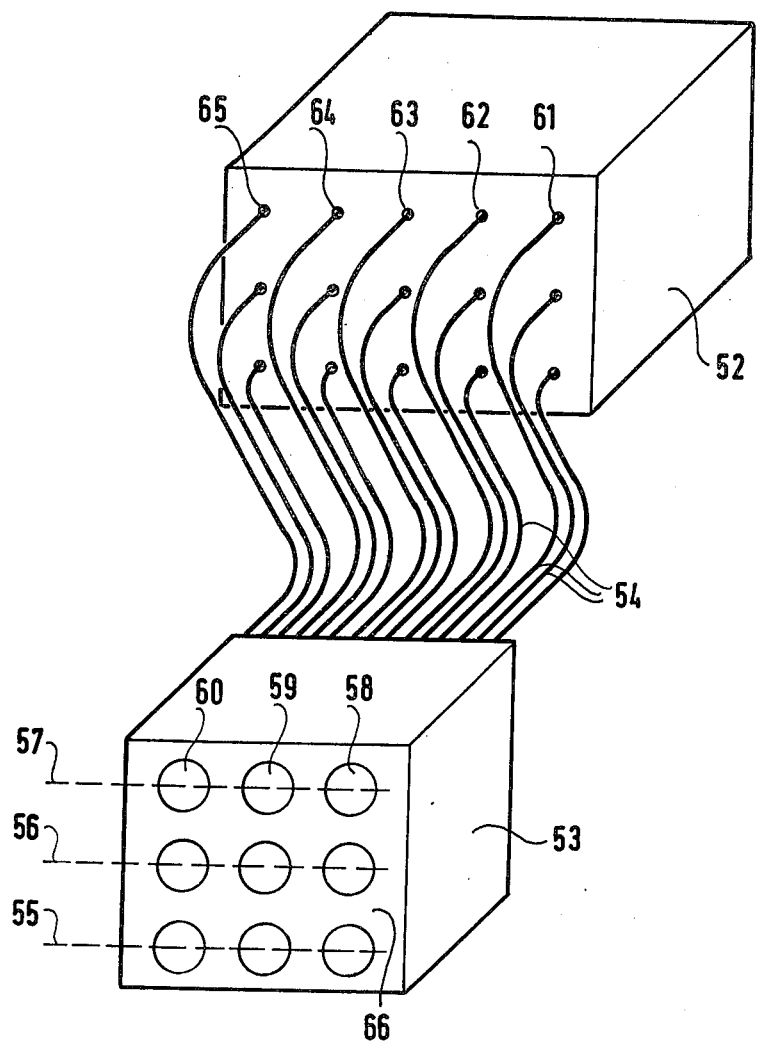
FIG. 4 is a perspective diagram of a second embodiment of the invention.

More complicated measurement apparatus can be made by assembling a plurality of apparatuses of the type already described. By way of example, FIG. 4 shows such an assembly of three identical apparatuses. A fixed housing 52 is connected to a moving housing 53 by a bundle of optical fibers 54. One face 66 of the moving housing 53 has three superposed rows 55, 56 and 57 of optical systems. Along the top row 57 there are, in order, an optical emission system 58, an optical reference system 59, and an optical measurement system 60. These three systems form part of a first sub-assembly constituted by a measurement apparatus of the type shown in FIGS. 1 and 2. The other components of this sub-assembly are separated into two groups located in the top portions of the housings 53 and 52 and interconnected by optical fibers 61 to 65, corresponding to the optical fibers F1 to F5. The combined apparatus includes two other similar sub-assemblies occupying the middle portions and the bottom portions respectively of the housings 53 and 52, ie. using rows 56 and 55 respectively.

Such an assembly can be used to measure the distances of three different points on an object, which can be of use when the object is of irregular shape.

I claim:

1. Measuring apparatus for measuring the position of an object, the apparatus comprising:

a light generator capable of emitting a beam of light along an emission axis to illuminate the surface of said object;

a photoelectric receiver;

a converging optical measurement system having a reception field that shares a volume of space in common with said emission beam, the optical system being suitable for forming an image of at least a portion of said illuminated surface when the object passes through said common volume, whereby at least some of the light from the emission beam is diffused from the object to said receiver; and means for processing the electrical signal delivered by said receiver in response to illumination by said diffused light;

wherein said receiver comprises at least two photoelectric measurement detectors having reception surfaces disposed next to one another along a straight line that intersects said emission axis, said measurement detectors receiving light diffused in respective different reception fields in said common volume, said reception fields overlapping partially in such a manner that as the object moves from a minimum distance from the measuring apparatus to a maximum distance therefrom through said common volume, the response of each detector is to give an electrical signal that rises from a minimum value to a peak value and then falls back to the minimum, with the detectors being activated successively and with the peak response of each detector co-inciding substantially with the beginning of the rise in the response of the next successive detector, whereby the object moving in said manner initially occupies a first zone in which it activates a first detector on its own, then a second zone in which it activates both the first detector and and a second detector, and so on until it arrives in a last zone in which activates a last detector on its own, with measurement being performed on the basis of the signal from the detector having a rising slope of response with increasing object distance for the zone in which the object is located, and with no measurement being performed when the object is in the last zone and activates the last detector on its own;

wherein the apparatus further includes a reference photoelectric detector having a reception surface placed close to that of said photoelectric receiver, and a reference optical system for forming an image of the illuminated surface of the object on the reference detector, with the reference detector having a reception field that includes the entire illuminated surface of the object regardless of its position in the common volume, whereby the reference detector delivers an electrical signal proportional to the total light power diffused by the object;

and wherein said electrical signal processing means comprise:

a logic circuit connected to receive the electrical output signals from the measurement detectors to determine from said output signals the zone in which the object is located, and to select the corresponding detector having a rising response with increasing object distance in said detected zone;

a divider circuit connected to receive the output signal from the selected detector and to receive the output signal from the reference detector, and to deliver an output ratio signal proportional to the ratio between the amplitudes of said signals received thereby; and a processor circuit capable of determining the distance of the object on the basis of its zone and said ratio signal.

2. Apparatus according to claim 1, wherein:

the generator comprises a light emitter, a first optical coupling system coupling the output from the light emitter to a first end of a first optical fiber, and an optical emission system disposed at the other end of said first fiber to deliver said light beam;

the reference detector comprises a reference photocell, a second optical coupling system coupling the sensitive surface of the reference photocell to the first end of a second optical fiber, said reference optical system being located at the other end of the second optical fiber;

the first measurement detector comprises a first measurement photocell, a third optical coupling system coupling the sensitive surface of the first measurement photocell to the first end of a third optical fiber;

the second measurement detector comprises a second measurement photocell, a fourth optical coupling system coupling the sensitive surface of the second measurement photocell to the first end of a fourth optical fiber;

the other ends of said third and fourth optical fibers are disposed along said straight line;

the processor circuit, the divider circuit, the logic circuit, the light emitter, the measurement and reference photocells the first through fourth optical coupling systems and said first ends of the first through fourth optical fibers are disposed in a first housing; and the said other ends of the first through fourth optical fibers, together with said emission, reference and measurement optical system are housed in a second housing, connected to the first housing by said optical fibers.

3. Apparatus according to claim 2, wherein the light emitter is a light emitting diode.

4. Apparatus according to claim 2, wherein the photocells are photodiodes.

5. Apparatus according to claim 1, wherein the apparatus further comprises:

means for modulating the intensity of the emitted beam at a known frequency; and a plurality of bandpass filters centered on said known frequency and inserted respectively between the electrical output of the reference detector and the divider, and between the electrical output of each measurement detector and the corresponding input to the logic circuit.

* * * * *